United States Patent [19]

Tharp

[11] Patent Number: 5,133,876
[45] Date of Patent: Jul. 28, 1992

[54] METHOD AND APPARATUS FOR AERATING WASTEWATER USING SEQUENTIAL AERATION OF DIFFERENT ZONES

[75] Inventor: Charles E. Tharp, Columbia, Mo.

[73] Assignee: Environmental Dynamics, Inc., Columbia, Mo.

[21] Appl. No.: 626,030

[22] Filed: Dec. 12, 1990

[51] Int. Cl.$^5$ .............................................. C02F 1/72
[52] U.S. Cl. .................................... 210/758; 210/102; 210/134; 210/137; 210/257.1; 261/DIG. 70
[58] Field of Search ............... 210/758, 102, 124, 127, 210/134, 137, 220, 257.1; 261/122, DIG. 70

[56] References Cited

U.S. PATENT DOCUMENTS

| | | | |
|---|---|---|---|
| 1,247,540 | 9/1914 | Jones | 261/DIG. 70 X |
| 1,247,541 | 9/1915 | Jones | 261/DIG. 70 X |
| 3,054,602 | 5/1958 | Proudman | 210/220 |
| 3,347,537 | 9/1965 | Morgan | 210/220 |
| 3,355,019 | 11/1965 | Mitchell | 210/220 |
| 3,615,078 | 12/1969 | Thayer | 210/220 |
| 3,679,053 | 7/1972 | Koulovatos et al. | 210/124 |
| 4,104,167 | 8/1978 | Besik | 210/257.1 |
| 4,238,338 | 12/1980 | Kinzer | 210/195.4 |
| 4,563,277 | 1/1986 | Tharp | 210/220 |
| 4,663,089 | 5/1987 | Saury et al. | 261/23.1 |
| 5,013,493 | 5/1991 | Tharp | 210/220 |

FOREIGN PATENT DOCUMENTS

| | | | |
|---|---|---|---|
| 0292374 | 9/1988 | European Pat. Off. | 210/102 |
| 0016997 | 4/1988 | Japan | 210/134 |
| 3004991 | 1/1991 | Japan | 210/137 |

*Primary Examiner*—Robert A. Dawson
*Assistant Examiner*—Ana M. Fortuna
*Attorney, Agent, or Firm*—Kokjer, Kircher, Bowman & Johnson

[57] ABSTRACT

A wastewater aeration system in which the volume of wastewater is divided into a plurality of different zones which are aerated sequentially one at a time with the full capacity of the blower supply sized for oxygenation needs. In the case where the oxygenation needs ar significant, the number is obtained by dividing the aeration rate required for mixing by the aeration rate required for oxygenation and rounding upwardly to the nearest integer. The blower capacity should continuously deliver the oxygenation rate to assure adequate aeration for both oxygenation and mixing while minimizing energy consumption. The air supply pipe network includes a header supply pipe for each zone and a valve for each header supply pipe which is automatically controlled by a programmable programmer. In the case where mixing only is required, the number of zones is limited by practicalities in order to prevent undue settling.

13 Claims, 3 Drawing Sheets

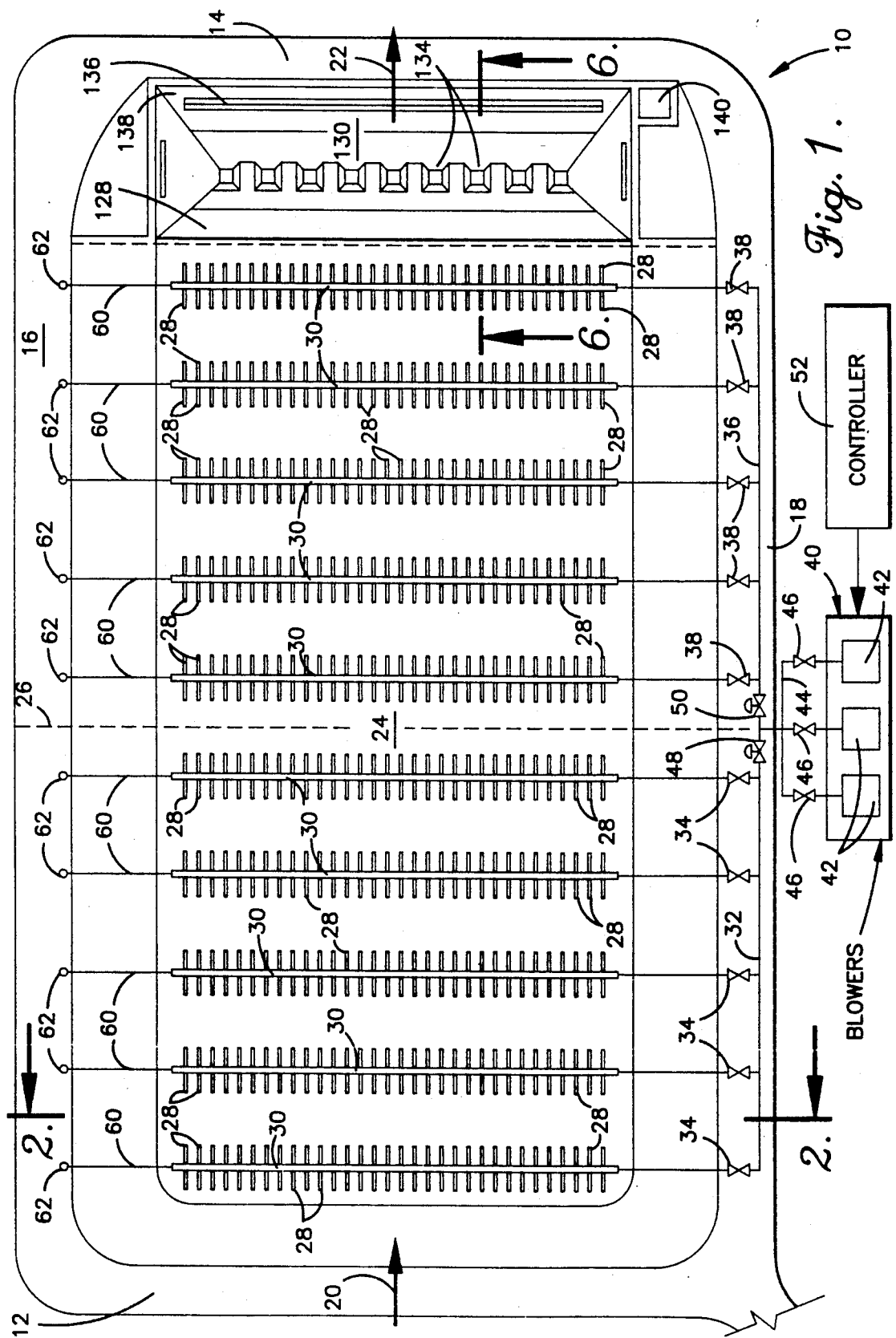

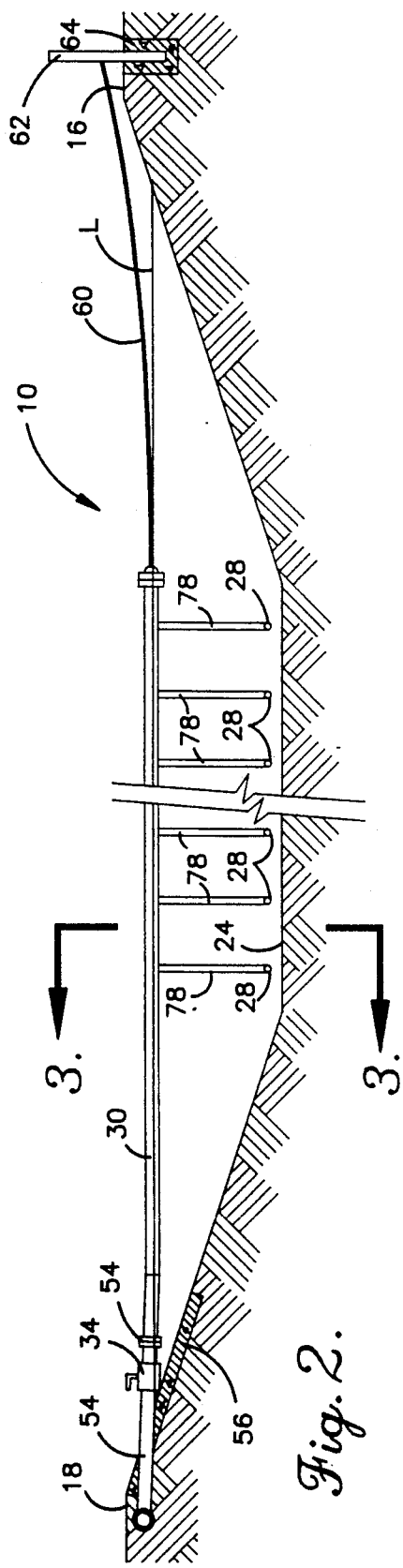
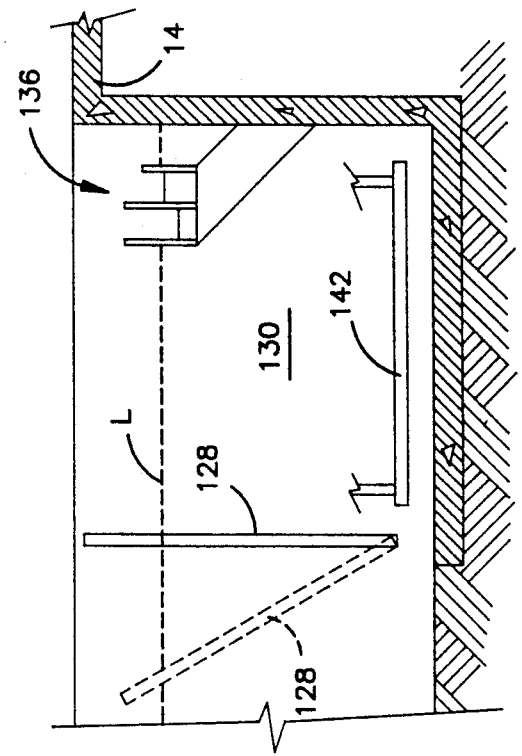
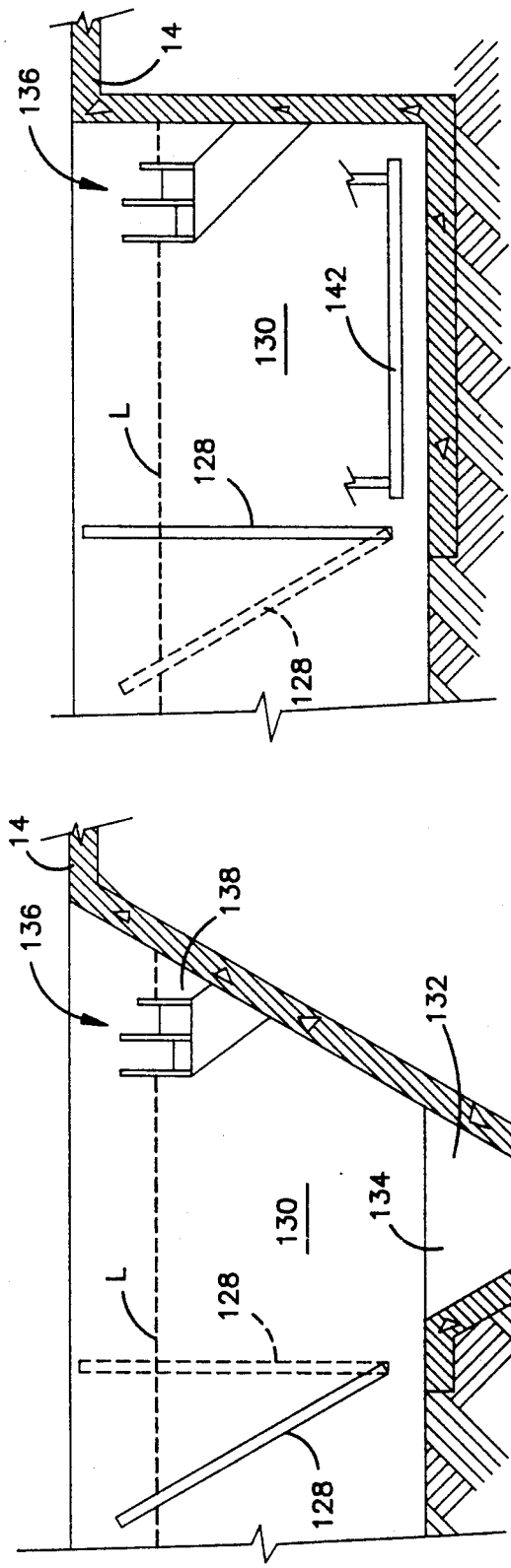

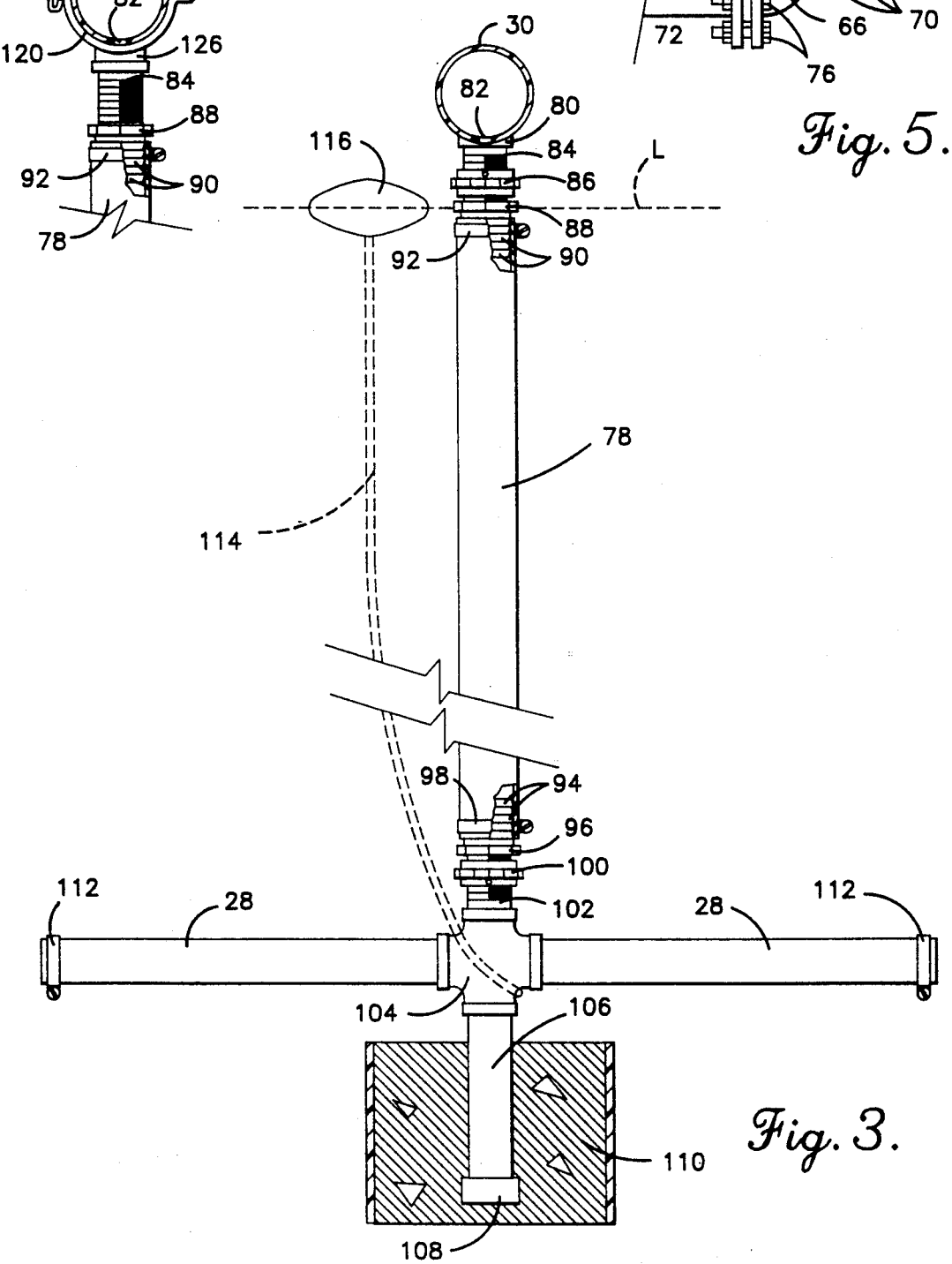

METHOD AND APPARATUS FOR AERATING WASTEWATER USING SEQUENTIAL AERATION OF DIFFERENT ZONES

BACKGROUND OF THE INVENTION

This invention relates generally to the treatment of wastewater and deals more particularly with a method and apparatus involving the programmed sequential aeration and/or mixing of multiple wastewater zones one at a time or in programmed combinations in order to achieve energy savings, process control or other benefits.

Conventional treatment of wastewater makes use of biological techniques and commonly involves applying aeration to a biological reactor such as a treatment basin. Aeration promotes the growth of bacteria and other microorganisms which remove soluble organic wastes from the water. The aeration serves the function of supplying oxygen (oxygenation) and also the function of mixing the wastewater so that the aerobic organisms and the soluble organics remain distributed and interact throughout the volume of the water to be treated. Subsequent to the aeration, the organisms may be removed in a clarifier and some may be returned to the biological reactor for use in the continuing treatment process. Excess sludge is removed and disposed of by known techniques. Alternatively, some systems have no or very low biological activity such that clarification may not be required. Nevertheless, mixing is required in order to maintain solids in suspension in the wastewater.

Processes of this type are routinely employed for activated sludge treatment with detention times as short as 1-4 hours. Modifications of the process involve treatments requiring significantly longer detention times that may exceed 48 hours. Currently, the process is employed as a continuous flow process in which the wastewater flows continuously through the treatment basin and the entire basin is continuously aerated.

Although this conventional aeration process is widely employed, it is characterized by substantial energy requirements in order to achieve adequate mixing. In the past, the oxygen transfer has been relatively inefficient, and the air requirements for oxygenation have almost always exceeded the air requirements for mixing. However, more modern diffuser technology provides more efficient oxygen transfer and the mixing requirements can exceed the oxygenation requirements. In many cases where high efficiency diffusers are used, the cfm to meet the oxygen requirements is less than the cfm to meet the mixing requirements, and the aeration rate must be significantly higher than required for oxygenation in order for adequate mixing in the entire basin to result.

By way of example, in a typical treatment system having a capacity of one million gallons per day in an extended aeration application at a BOD level of 200 milligrams per liter, the rate of aeration required for oxygen may be approximately 1550 cfm (cubic feet per minute) based on the use of high efficiency diffusers and a given basin depth. For the same system, biological or solids mixing may require about 2500 cfm of air using present technology and based on the accepted value of 0.12 cfm per square foot of floor area. The aeration capacity for this system using conventional techniques must be 2500 cfm for mixing, and the entire basin must be continuously aerated at this rate even though it is excessive from the standpoint of oxygenation and results in about 950 cfm of air essentially being devoted solely to mixing and not used for oxygenation. Use of high efficiency diffusers causes this waste of energy to increase.

It is thus evident that conventional systems must be equipped with a blower capacity well in excess of the capacity needed for oxygenation and, perhaps even more importantly, require much more energy for mixing than is needed to achieve only oxygenation of the wastewater. Even more of the total energy is devoted to mixing as the BOD level decreases because the oxygenation requirements then decrease with no corresponding decrease in the mixing requirements. High efficiency diffusers create the same effect. Mixing only systems such as equalization basins represent the ultimate in mix limited systems.

SUMMARY OF THE INVENTION

The present invention provides an improved mixing system in which the wastewater is selectively zoned and the individual zones are sequentially mixed with only the amount of air needed for oxygenation or for mixing. By properly selecting the size and number of zones, the wastewater is mixed adequately at the sam time by matching mixing and oxygenation energy. Both proper oxygenation and proper mixing are achieved with significant savings in energy and blower capacity requirements such that both capital cost savings and operation cost savings are effected.

In accordance with the invention, the wastewater treatment system may include a single basin through which wastewater moves continuously or multiple basins arranged in series or parallel. In either case, the basin or basins can have virtually any configuration and/or size. With the aeration rates required for oxygenation and for mixing independently calculated for the system, the number of zones is calculated by dividing the oxygenation rate into the mixing rate and rounding upwardly to the nearest integer. Thus, for a system having an oxygenation rate of 1550 cfm and a mixing rate of 2500 cfm, the optimum number of zones is obtained by dividing 1550 into 2500 and rounding the result upwardly to the nearest integer, in this case the number 2. Similarly, if the aeration rate for oxygenation is 800 cfm and for mixing 3,000 cfm, four zones are indicated (3,000/800 rounded upwardly to the nearest integer).

The zones can be arranged in series in a single basin, or they can constitute separate basins In any case, an aeration system which serves all of the wastewater is arranged to provide sequential aeration of each zone or basin. It is an important aspect of the invention that the aeration system has a central compressed air supply and an automatic valve for the distribution piping of each zone which is controlled by a programmable controller. For the optimum application of the process, the blower capacity should be equal to the aeration rate required for oxygenation.

When the aeration system is operating, the blower supply runs continuously and the supply piping that extends to the aeration zones is controlled by the programmable controller and valves such that the zones are aerated in an infinitely programmable fashion with the full blower system capacity. For example, in a system having three zones A, B and C, the valve for the piping leading to zone A is opened and the valves for zones B and C are closed for a duration coinciding with the treatment period for zone A. During this period, zone A receives the entire volume of the aeration system. Next, zone B is aerated by itself for its treatment period by opening the valve for zone B and closing the valves for zones A and C. The final part of each cycle involves opening the valve for zone C and closing the valves for zones A and B to aerate zone C but not the other two zones. Succeeding cycles each involve aerating the three zones sequentially one at a time for the desired treatment period of each zone (typically, 2 to 20 minutes per zone).

In this manner, each zone is aerated sufficiently for oxygenation because the aeration system operates continuously at full capacity which is equal to the capacity required for oxygenation of the entire biological reactor. At the same time, each individual zone is aerated sufficiently for biological mixing because it occupies only ⅓ of the basin and is aerated during each of its treatment periods at a rate that is at least equal to ⅓ of the mixing rate required for the entire basin. Although the mixing is not continuous in each zone, the time between treatment periods for each zone is short enough to prevent suspended solids from settling to the bottom or otherwise creating problems, and the treatment periods should also be short enough to prevent problems with oxygenation. Consequently, each zone is mixed in a manner that is substantially equivalent to the mixing in a system that involves constantly aerating the entire volume of waste-water at the applicable mixing rate.

Practice of the invention is also possible in a system that does not have biological requirements, such as a sludge holding basin, an equalization basin for storm water flow, or another system having little if any oxygen requirements. In such systems, the mixing requirements will generally control the duration of the cycle. In other cases, the oxygen utilization rates will control the cycle duration. The mixing and oxygenation periods ma be of different duration in the different zones, and the frequency of the sequencing should be programmed to optimize the particular process that is being practiced.

The present invention is based on recognition of the fact that sedimentation of solids in wastewater does not occur instantaneously so constant energy application at all points is not necessary for adequate mixing. If solids do settle, proper application of enough energy at the location of the sedimentation will resuspend the solids and put the system back into service.

The frequency of the sequencing is based on one of two mutually independent factors: (1) the sequencing must take place at a frequency that prevents solid deposition from becoming so excessive that solid resuspension is impossible and (2) the sequencing must take place at a frequency to maintain the oxygen level at the desired concentration in all zones. Preventing undue solid deposition typically requires mixing every 30-60 minutes and even more infrequently in some cases. The frequency required for oxygenation varies widely, depending upon the particular process involved. For high rate activated sludge processes, cycling every 2-3 minutes can be required. For low F/M processes, the sequence interval may be on the order of 10 minutes. Systems requiring nutrient control or other biological constraints may have sequence intervals as great as 10 or 20 minutes.

It is also possible for the treatment to vary in frequency and/or duration from zone to zone. For example, the oxygen demand may be relatively high at the front or inlet end of the plant, and zones in this area may require a treatment of longer duration than other zones. Thus a duration of 15 to 20 minutes in the first zone and 5-10 minutes in subsequent zones may be desirable. By properly programming the frequency and duration of the aeration in different zones, the process needs of both mixing and oxygenation can be optimally met with substantial savings in overall energy consumption.

Other and further objects of the invention, together with the features of novelty appurtenant thereto, will appear in the course of the following description.

DESCRIPTION OF THE DRAWINGS

In the accompanying drawings which form a part of the specification and are to be read in conjunction therewith and in which like reference numerals are used to indicate like parts in the various views:

FIG. 1 is a diagrammatic plan view of a typical wastewater treatment system constructed in accordance with the present invention;

FIG. 2 is a fragmentary sectional view on an enlarged scale taken generally along line 2—2 of FIG. 1 in the direction of the arrows, with the break lines indicating continuous length;

FIG. 3 is a fragmentary sectional view on an enlarged scale taken generally along line 3—3 of FIG. 2 in the direction of the arrows, with the break lines indicating continuous length;

FIG. 4 is a fragmentary sectional view similar to the upper portion of FIG. 3, but depicting an alternative connection between the air laterals of the aeration system and the diffuser feeder tubes;

FIG. 5 is a fragmentary elevational view on an enlarged scale showing the connection between the capped end of each air lateral in the aeration system and the cable which assists in restraining the lateral at the water line of the basin;

FIG. 6 is a fragmentary sectional view on an enlarged scale taken generally along line 6—6 of FIG. 1 in the direction of the arrows;

FIG. 7 is a fragmentary sectional view similar to FIG. 6 but showing an alternative construction for the clarifier section of the wastewater treatment system.

DETAILED DESCRIPTION OF THE INVENTION

Referring now to the drawings in more detail and initially to FIG.1, numeral 10 generally designates a waste-water treatment basin having opposite ends 12 and 14 and opposite sides 16 and 18 which cooperate to provide a generally rectangular configuration. Wastewater is treated in the basin 10 in a continuous flow process, with the influent entering the basin at end 12 as indicated by the directional arrow 20 and the effluent being discharged from the system at end 14 as indicated by the directional arrow 22. The wastewater that is being treated in the basin 10 flows continuously from left to right as viewed in FIG. 1 and as indicated by the directional arrows 20 and 22. The basin 10 has a substantially flat bottom 24, and the sides and ends of the basin slope outwardly and upwardly from the bottom 24, as particularly illustrated in FIG. 2 for the sides. Alternatively, the side and end walls can be vertical In accordance with the present invention, the basin 10 is divided into a plurality of zones, and the zones are aerated sequentially in a programmed manner in order to treat the wastewater contained in the basin. In many applications of the invention, the number of zones into which the basin 10 is divided may be determined by dividing the rate required for mixing of the wastewater by the rate required for oxygenation of the wastewater and then rounding the result upwardly to the nearest integer (unless the result is already an integer). For example, the system shown in FIG. 1 is able to treat 1,000,000 gallons per day of wastewater, and biological mixing of the entire basin requires an air application rate of 2,500 cfm. The air application rate required to adequately oxygenate the wastewater is approximately 1,550 cfm. Consequently, the optimum number of zones into which the basin 10 should be divided is obtained by dividing 2,500 by 1,550 and rounding the result upwardly to the nearest integer which is two in this example. Thus the basin 10 is divided by the imaginary line 26 in FIG. 1 into two zones designated zone A (to the left of the dividing line 26) and zone B (to the right of the dividing line 26). The two zones A and B contain substantially the same volume of wastewater, although they can and often do differ in size.

The two zones A and B are provided with the same number of aerators which are arranged identically in the two zones. However, the different zones may have different numbers of aerators and they may be arranged differently. The aerators may be tubular aerators 28 or any other aerator suitable for intermittent operation, and the aerators are arranged in banks which are supplied by a plurality of parallel air laterals 30. For example, each zone A and B may be provided with five air laterals, with each air lateral supplying 64 different diffusers 28 arranged in pairs extending on opposite sides of the lateral. The air laterals 30 in zone A are supplied with air by a supply pipe 32. Each lateral 30 is equipped with an isolation and throttling valve 34 which controls the flow of air from the supply pipe 32 to the individual air lateral served by the valve 34. The air lateral 30 in zone B are similarly supplied with air by a supply pipe 36, and each air lateral 30 in zone B is likewise equipped with an isolation and throttling valve 38 for controlling the application of air from the supply pipe 36 to the air lateral which is served by the particular valve 38.

The supply pipes 32 and 36 are supplied with air by a blower system which is generally identified by numeral 40 and which may include one or more blowers 42. In the system illustrated in FIG. 1, the blower system 40 includes three individual blowers 42, and the discharge side of each blower is connected with a common manifold 44. Each blower 42 has a valve 46 connected between the blower and the manifold in order to control the application of air from the blower to the manifold or to isolate the blower for service.

The manifold 44 connects with supply pipe 32 through an automatic programmable valve 48 which controls the flow of air to zone A. Similarly, manifold 44 connects with the other supply pipe 36 through an automatic programmable valve 50 which controls the flow of air from the manifold to zone B. It is noted that when valve 48 is open and valve 50 is closed, the entire air volume supplied by the blower system 40 is directed to supply pipe 32 and then to zone A, with none of the air going to zone B. Conversely, when valve 50 is open and valve 48 is closed, all of the air from the blower system 40 is supplied to pipe 36 and the laterals and aerators in zone B. The capacity of the blower system 40 should be equal to or slightly greater than the aeration rate required for oxygenation of the entire basin 10. (1,550 cfm in the example given previously.)

A programmable controller 52 operates automatically to control the opening and closing of valves 48 and 50. The controller 52 may be programmed in order to effect automatic opening and closing of the valves 48 and 50 at selected times and in selected sequences. For example, the valves 48 and 50 may be controlled by conventional automatic valve operators which are energized and deenergized by the controller 52 in accordance with a sequence and timing scheme programmed in the controller 52. It is contemplated that the controller 52 will be a microprocessor based unit It is also contemplated that a delay will be provided between the opening of one valve and the closing of the other valve in order to prevent the blower from acting against a totally closed pipe system.

As best shown in FIG. 2, the air laterals 30 float on the wastewater in the treatment basin 10, and the ends opposite the inlet ends are held at the water level L by a restraint system which prevents each lateral from lashing around on the wastewater. The air supply header 32 may be buried, and short metal air laterals 54 extend from the supply header 32 and are anchored in a concrete slab 56 on the sloping area of side 18. The valve 34 is preferably mounted to the metal air lateral 54, and each metal lateral 54 has a flange connection at 58 with a plastic pipe (preferably polyethylene or a similar material) which forms the main length of the air lateral 30.

The opposite end of each air lateral 30 is capped and connects with one end of a cable 60. The opposite end of each cable 60 is secured to a post 62 which is in turn anchored in a concrete footing 64 on the side 16 of the basin. As best shown in FIG. 5, the end of the cable 60 opposite the post 62 is looped through a lug 66 extending from a flange 68. The cable loop is secured by one or more cable clips 70. The capped end of the air lateral 30 is provided with an enlarged collar 72 which is sandwiched between the flange 68 on its outer surface and a metal backup ring 74 on its inner surface. The backup ring 64 is fitted around the air lateral 30 and is secured to the flange 68 by suitable fasteners 76 which may take the form of nuts and bolts.

As shown particularly in FIGS. 2 and 3, the diffusers 28 are located a slight distance above the bottom 24 of the basin and are generally arranged in pairs, with each pair of diffusers 28 being supplied with air by a vertical feeder tube 78 which connects with and extends downwardly from the air lateral 30. As shown particularly in FIG. 3, the bottom of each air lateral 30 is provided with a plurality of downwardly extending outlet spouts 80 which register with openings 82 drilled in the air lateral 30. An externally threaded fitting 84 is fitted on and side fushion welded to each lateral 30, and a union 86 is threaded onto each fitting 84. Threaded into the lower end of each union 86 is an adapter 88 having a series of barbs 90 on its lower end. Each feeder tube 78 is fitted over the barbs 90 and is secured to the barbs by tightening a hose clamp 92. The feeder tubes 78 may be constructed of EPDM or any other suitable material.

With continued reference to FIG. 3 in particular, the bottom end of each feeder tube 78 is fitted around a plurality of barbs 94 which are formed on an adapter 96. A hose clamp 98 is tightened around the lower end of tube 78 in order to secure it to the barbs 94. A union 100 is threaded onto the bottom end of each adapter 96, and an externally threaded fitting 102 is screwed into the lower end of each union 100. The lower end of each fitting 102 is threaded into a four-way cross fitting 104, and the two diffusers 28 of the diffuser assembly are fitted in and solvent welded to the aligned side openings of the fitting 104. A short pipe 106 equipped with an end cap 108 is fitted in and solvent welded to the bottom opening of the fitting 104. The pipe 106 and its cap 108 are anchored in concrete 110 which serves as ballast to hold the tube 78 vertical and to stabilize and level the diffusers 28.

The diffusers 28 depicted in the drawings are tubular diffusers which may be of the type having a porous membrane sleeved around and secured to a perforated plastic pipe, as by means of hose clamps 112. The air which is supplied from the air laterals 30 through the feeder tubes 78 is applied to the tubular diffusers 28 through the fittings 104 and is discharged from the diffusers in the form of fine bubbles which pass through the porous membrane sleeve.

It should be noted that other types of diffusers may be used, including coarse bubble diffusers, dome diffusers and flat plate diffusers. Also, the supply piping may be floating laterals used with floor mounted diffusers, laterals which extend along or near the basin floor with fixed diffusers mounted on the laterals, or virtually any other air supply system that is useful to supply the necessary air.

Each diffuser assembly is preferably equipped with a flexible retrieval rope 114 which is tied to the fitting 104 at its lower end. The top end of each rope 114 may be secured to a float 116 which floats on top of the wastewater. Alternatively, the upper end of each rope 114 may be tied to the air lateral 30. In any event, the top end of the rope is accessible from above the surface of the wastewater so that it can be used to retrieve the diffuser assemblies which may be disconnected from the lateral 30 by means of the union 86. In this manner, servicing and replacement of the diffuser assemblies is facilitated.

FIG. 4 depicts an alternative arrangement for connecting each of the feeder tubes 78 with the air laterals 30. A two piece saddle assembly having an upper saddle section 118 and a lower saddle section 120 may be fitted around the air lateral 30, and the two saddle sections may be connected by a suitable connector 122. A hinge 124 permits the saddle sections to open and close on the pipe in hinged fashion. The lower saddle sections 120 are provided with outlet spouts 126 which register with the drilled openings 82 in the air lateral 30. The spouts 126 are internally threaded so that the fittings 84 may be threaded into them in order to secure the feeder tubes 78 to the air laterals The barbed adapter 88 may be threaded into spout 126. It is noted that the provision of the saddle mounting arrangement results in a strong connection between the air laterals 30 and the diffuser assemblies. The saddle mounting arrangement may be of the type disclosed in patent application Ser. No. 340,265, filed on Apr. 19, 1989 in the name of Charles E. Tharp, to which reference may be made for a more detailed description of the saddle construction.

The effluent end of the treatment basin 10 may be provided with a clarifier section which is depicted in alternative forms in FIGS. 6 and 7 and which is optional and not required in many systems such as equalization basins and aerator digesters. Referring first to FIG. 6, an adjustable baffle 128 extends across the basin 10 to define a clarifier zone 130 between the baffle 128 and the end 14 of the basin. As depicted by the broken lines in FIG. 6, the baffle 128 may be adjustable as to its inclination and thus its effective height. The wastewater passes under baffle 128 to the clarifier, while effluent passes over the top of the weir assemblies at the outlet of the clarifier. The clarifier zone 130 is provided at its bottom with a trough 132 having a plurality of conventional hopper clarifiers 134, the details of which are not important to the present invention. A conventional weir 136 is provided on the end wall in the clarifier zone 130 and defines a weir trough 138 from which the effluent is ultimately discharged from the treatment basin 10 at the end 14. At one end of the clarifier zone 130, a sludge return sump 140 (see FIG. 1) is provided, and a conventional sludge return pump (not shown) operates to pump the sludge which is collected in the sump 140.

Referring now to FIG. 7, an alternative configuration and arrangement of the clarifier zone 130 is depicted. Rather than making use of the hopper clarifiers 134, the arrangement shown in FIG. 7 uses a mechanical clarifier 142 which may be any of a variety of mechanical clarifiers that are commercially available. In addition, rather than being mounted on an inclined wall as shown in FIG. 6, the weir 136 in the arrangement of FIG. 7 is mounted on a vertical end wall of the clarifier zone 130.

In operation, the wastewater flows continuously from the influent end 12 through the treatment basin 10 and is aerated in the treatment basin. Aeration of the wastewater is effected sequentially in zones A and B one at a time with the full capacity of the blower system 40 being supplied to the zone that is undergoing aeration. For example, at the start of each cycle, the controller 52 may be programmed to maintain valve 48 open and valve 50 closed for the duration selected for the treatment period in zone A (10 minutes, for example) and to thereafter close valve 48 and open valve 50 for a time corresponding to the duration of the treatment period for zone B (also 10 minutes). Consequently, while zone A is being aerated zone B is not aerated and the full capacity of the aeration system is thus devoted to zone A during its treatment period. Similarly, the full capacity of the blower system is available to zone B during its treatment period.

By aerating the zones A and B sequentially in this manner with the full capacity of the blower system, each zone is supplied with sufficient air to effect both oxygenation and mixing. Thus, if the oxygenation requirements for the wastewater are 1,550 cfm and the mixing requirements are 2,500 cfm, zone A receives ample oxygen because it is aerated at the required rate of 1,550 cfm for the entire reactor during its treatment period. The same is true for zone B. Also, because each zone A and B receives 1,550 cfm of air half of the time during each cycle, each zone is the recipient of more energy per square foot and is mixed more effectively than in the case where the entire basin receives 2,500 cfm all of the time. Even though neither zone is continuously mixed, the time between successive treatment periods in the zones is so short that the solids are unable to settle appreciably or otherwise cause problems in the treatment process. Solids in each zone are resuspended each time the zone is treated. Because each zone A and B requires only ½ of 2,500 cfm of air for adequate mixing, only 1,250 cfm in each zone is necessary to adequately suspend and mix the biological solids. Thus, the 1,550 cfm provides more mixing energy per unit volume or per square foot than is required by standard practices currently employed.

Another benefit of the system is that the air supply for aeration can be decreased in periods of light loading. For example, if only 1,250 cfm of air is required for mixing and 1,550 cfm is available for oxygenation, the system can be turned down whenever the load is light, as is common during the early stages of a project and during seasonal loading decreases. In this example, the decrease is $(1,550-1,250) \div 1,550$ or about 20%. It can be 50–60% in some cases, depending upon the number of zones and the closeness between the mixing and oxygenation valves. The energy savings are apparent and can be especially great on a project where an estimated future load never develops and full design capacity is never needed. Then, the saving in energy can be 20–60% for the full system life.

It is noted that in this example the aeration cycles are repeated in succession so that zone A is subjected to 10 minutes of aeration, followed by 10 minutes of no aeration (during which zone B is aerated, followed by 10 minutes of aeration, etc. The same is true for zone B. Because the two zones are similar in size and are aerated equally, the wastewater they contain is treated in a similar manner.

Because the blower system 40 is operated to aerate at a constant rate of 1,550 cfm, substantial energy savings are achieved in comparison with a conventional treatment system or current design practice which would require continuous operation of the blower system at a much larger capacity (the 2,500 cfm rate that is required for mixing of the entire basin). In addition, the blower capacity is reduced considerably in comparison to that required by a conventional system, and the capital costs of the blower system are likewise reduced.

The present invention makes optimum use of high efficiency diffusers. As the diffuser efficiency increases, the amount of air needed for oxygenation decreases. As the amount of air required for oxygenation decreases, the optimum number of zones increases and the potential energy saving also increases. The oxygen requirements control the amount of energy because they dictate the number of zones and thus control the mixing energy. In systems involving only mixing and little or no oxygenation, practicalities limit the number of zones employed because there is no oxygenation level that controls the maximum number of zones.

In the system illustrated in FIG. 1, there are only two different zones A and B, and they are arranged in series in the same basin. It should be understood that more than two zones can be provided. Regardless of the number of zones, each zone should be provided with its own valve which can be opened during the treatment period for the zone and closed during the treatment periods for other zones. For example, if there are three zones rather than two, there should be three valves in the system (one for each zone), and the zones should then be sequentially aerated one at a time or in some other programmed sequence. In some cases, it may be desirable to have zones which differ in size and in the durations of their treatment periods to facilitate process or operation needs. In addition, rather than the zones being arranged serially in a single basin, each zone can occupy a different basin, with the different basins arranged in parallel but still treated sequentially through suitable programming of the valves which control aeration and mixing of the individual zones (utilizing a central blower system which is common to all of the basins).

By selecting the number of zones in the manner previously indicated, enough energy is supplied to each zone in order to keep all solids in suspension and prevent significant solid settling which could create problems. At the same time, there is assurance that the proper oxygen level is maintained in each zone.

If more than two zones are employed, the invention contemplates the capability of aerating the zones in virtually any sequence or in different sequences in different cycles (such as first ABC, then CBA, then ACB etc.). Also, two or more zones can be aerated at a given time.

It should be noted that virtually any aeration process and a basin having virtually any geometry can benefit from the sequential aeration of the different zones in accordance with the present invention. However, the present invention is particularly well suited for any mixing limited application in basins such as low F/M activated sludge systems. Generally, such a system is designed for a detention time of approximately 24 hours or longer (considered to be a traditional extended aeration process). Optional applications for the present invention are in other types of processes such as aerobic digesters where sequencing of the mixing can be employed to reduce the total energy to a basin by concentrating high energy levels and sequencing the zones so that each zone receives aeration at a high energy level. The same process can be employed for dilute wastewaters in conventional activated sludge plants with low organic loads having minimum energy requirements for oxygen.

Preferably, the controller 52 may be programmed to control the operation of the individual blowers, operation of the various valves, air lift sludge returns, air lift waste pumps and other equipment included in the extended aeration system. Preferably, when the automatic programmable valves 48 and 50 are being operated, the valve which has been closed is opened before the other valve is closed in order to prevent the blowers from operating against two closed valves for even a short period of time. It is noted that one or more of the air laterals 30 can be arranged and controlled to operate continuously (by providing additional header supply piping, for example). In addition, one or more of the laterals 30 can be sequenced independently of the sequencing of the zones. These and other specific operating modes in conjunction with or separate from the sequencing of the zones are contemplated by the invention.

By making us of the method and apparatus of the present invention, the number of zones that are being aerated and/or mixed can be controlled, the specific zone or zones that are being aerated can be selected, the DO (dissolved oxygen) level in each zone can be controlled, the frequency of aeration in each zone can be controlled, mixing as an energy limitation is minimized, basins having virtually any geometry can be employed, all reactions can be confined to a single vessel that operates with series or other sequencing of the aeration, and there is no requirement to interrupt flow through the vessel.

The method and apparatus of the present invention uses a given air volume for oxygenation and a different volume for mixing. The diffusers are designed to enable them to handle the total air flow when the entire basin is in operation. In actual practice, two or more zones are used with all of the air being supplied to the individual zones. Consequently, additional diffusers in each zone are required to keep the air flux rate within the normal design parameters. Typically, 30%–50% more diffusers are required to provide this operational flexibility. The result is better oxygen transfer efficiency, superior membrane life and enhanced system flexibility, although there is an increase in the capital costs.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without department from the scope thereof, it is to be understood that all matter herein set forth or shown in the accompanying drawings is to be interpreted as illustrative and not in a limiting sense.

Having thus described the invention, I claim:

1. A method of treating a volume of wastewater containing suspended solids wherein a preselected rate of air required for mixing of the waste water is applied to maintain the solids in suspension therein, said method comprising the steps of:
   dividing the volume of wastewater into a plurality of zones;
   providing a central blower supply having a capacity to supply air at a rate substantially equal to said preselected rate divided by the number of zones; and
   directing the full capacity of said blower supply to all of said zones one at a time in sequence.

2. A method of aerating a volume of wastewater characterized by a predetermined rate of air application required for oxygenation and a higher rate of air application required for mixing, said method comprising the steps of:
   dividing the volume of wastewater into a plurality of zones equal in number to a number obtained by dividing said higher mixing rate by said predetermined oxygenation rate and rounding the result upwardly to the next higher integer if said result is not an integer;
   applying air sequentially to said zones at a rate of application at least equal to said predetermined oxygenation rate; and
   terminating the application of air to each zone at the end of a treatment period having a programmed duration, whereby each zone is aerated at said predetermined rate and is mixed at said higher rate for the corresponding treatment period.

3. The method of claim 2, wherein:
   each of said zones is substantially the same size as the other zones; and
   the duration of the treatment period for each zone is substantially the same as the duration of the treatment period for each of the other zones.

4. A method of aerating a volume of wastewater characterized by a predetermined rate of air application required for oxygenation and a higher rate of air application required for mixing, said method comprising the steps of:
   (a) defining a plurality of zones in said volume at least equal in number to a number obtained by dividing said higher rate by said predetermined rate;
   (b) providing an aeration path to each zone;
   (c) directing air along one aeration path for a programmed treatment period at a rate of application substantially equal to said predetermined rate, while closing all of the other aeration paths; and
   (d) repeating step (c) for each of the other aeration paths, thereby aerating each of said zones at said predetermined rate and effecting mixing therein at said higher rate.

5. The method of claim 4, wherein:
   each aeration path has a valve for opening and closing the aeration path; and
   said directing step for each path includes opening the valve for the corresponding path and closing the valve for each of the other paths.

6. The method of claim 4, wherein:
   each of said zones is substantially the same size as the other zones; and
   the duration of the treatment period for each zone is substantially the same as the duration of the treatment period for each of the other zones.

7. The method of claim 4, wherein the number of zones is obtained by dividing said higher rate by said predetermined rate and rounding the result upwardly to the next higher integer if said result is not an integer.

8. Apparatus for treating a volume of wastewater which requires a predetermined aeration rate for oxygenation and a higher aeration rate for mixing of the wastewater and which contains a plurality of different zones equal in number at least to a number obtained by dividing said higher aeration rate by said predetermined aeration rate, said apparatus comprising:
   a plurality of diffusers distributed in said volume and operable upon the receipt of air to aerate the wastewater, said diffusers being arranged to define a plurality of different sets of diffusers with each set located in a different one of said zones of said volume;
   an air source for supplying air under pressure, said air source having a predetermined capacity at least as great as said predetermined aeration rate;
   a piping network for directing air from said air source to said diffusers, said network providing a plurality of separate air paths extending from said air source to the diffusers in the respective sets;
   a valve in each air path for opening and closing the path; and
   means for automatically opening said valves sequentially for successive aeration periods and for maintaining at least one selected valve closed during each aeration period to avoid aerating the zone corresponding to each closed valve, thereby aerating the zones with air applied at rate corresponding to the capacity of the air source.

9. Apparatus as set forth in claim 8, wherein:
   each of said zones occupies substantially the same volume; and
   said automatic opening means is effective to provide substantially the same duration for the aeration period of each zone.

10. Apparatus as set forth in claim 8, wherein said automatic opening means is programmable to effect programming of the sequence in which the valves are opened and the duration of the aeration period for each zone.

11. Apparatus as set forth in claim 8, wherein said piping network comprises:
   a plurality of air lateral pipes for each set of diffusers, each air lateral pipe being connected with a plurality of the diffusers in the corresponding set to supply air thereto; and a supply pipe for each set of diffusers connected to each of the lateral pipes for the corresponding set to supply air to said lateral pipes, each supply pipe having the valve for the corresponding diffuser set and communicating with the air source through said valve.

12. Apparatus as set forth in claim 11, including valve means for each lateral pipe for controlling the flow of air to the lateral pipe from the corresponding supply pipe.

13. In a continuous flow process of treating a volume of liquid having influent continuously entering the volume and effluent continuously discharging from the volume, wherein the liquid has solids suspended therein and a preselected design rate of air application is necessary to maintain the solids in suspension, an air application method comprising the steps of:

dividing the volume into a preselected number of zones greater than one; and effecting a sequencing cycle during which air is directed into all of said zones one at a time in sequence at a rate substantially equal to said preselected design rate divided by said preselected number of zones, each zone receiving air for a predetermined treatment period during said sequencing cycle with the air application being discontinued to all zones except the one undergoing treatment at a given time during the sequencing cycle.

* * * * *